US008930719B2

(12) United States Patent
Moskowitz

(10) Patent No.: US 8,930,719 B2
(45) Date of Patent: Jan. 6, 2015

(54) DATA PROTECTION METHOD AND DEVICE

(76) Inventor: Scott A. Moskowitz, Sunny Isles Beach, FL (US)

( * ) Notice: Subject to any disclaimer, the term of this patent is extended or adjusted under 35 U.S.C. 154(b) by 0 days.

(21) Appl. No.: 13/556,420

(22) Filed: Jul. 24, 2012

(65) Prior Publication Data

US 2013/0014271 A1 Jan. 10, 2013

Related U.S. Application Data

(60) Continuation of application No. 11/895,388, filed on Aug. 24, 2007, which is a division of application No. 10/602,777, filed on Jun. 25, 2003, now Pat. No. 7,664,263, which is a continuation of application No. 09/046,627, filed on Mar. 24, 1998, now Pat. No. 6,598,162.

(51) Int. Cl.
| *G06F 21/00* | (2013.01) |
| *G06F 21/10* | (2013.01) |
| *G06F 21/12* | (2013.01) |
| *G06F 21/16* | (2013.01) |
| *G06F 21/33* | (2013.01) |
| *G06T 1/00* | (2006.01) |
| *H04L 9/06* | (2006.01) |
| *H04L 9/32* | (2006.01) |

(52) U.S. Cl.
CPC .............. *G06F 21/10* (2013.01); *G06F 21/125* (2013.01); *G06F 21/16* (2013.01); *G06F 21/335* (2013.01); *G06T 1/0021* (2013.01); *H04L 9/065* (2013.01); *H04L 9/3236* (2013.01); *H04L 9/3247* (2013.01); *G06F 2211/007* (2013.01); *G06F 2221/0737* (2013.01); *G06F 2221/2107* (2013.01); *G06T 2201/0064* (2013.01); *G06T 2201/0083* (2013.01); *H04L 2209/605* (2013.01); *H04L 2209/608* (2013.01)
USPC ......................................................... 713/193

(58) Field of Classification Search
CPC ..... G06F 21/10; G06F 21/335; G06F 21/125; G06F 21/16; G06F 2221/2107; G06F 2211/007; G06F 2221/0737; H04L 9/3247; H04L 9/3236; H04L 9/065
See application file for complete search history.

(56) References Cited

U.S. PATENT DOCUMENTS

| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |

(Continued)

FOREIGN PATENT DOCUMENTS

| EP | 0372601 | 6/1990 |
| EP | 0565947 | 10/1993 |

(Continued)

OTHER PUBLICATIONS

1997, Merriam-Webster's Collegiate Dictionary, 10th Ed., Merriam Webster, Inc., p. 207.

(Continued)

*Primary Examiner* — Izunna Okeke
(74) *Attorney, Agent, or Firm* — Neifeld IP Law, PC

(57) ABSTRACT

An apparatus and method for encoding and decoding additional information into a digital information in an integral manner. More particularly, the invention relates to a method and device for data protection.

50 Claims, 1 Drawing Sheet

(56) References Cited

U.S. PATENT DOCUMENTS

| | | | |
|---|---|---|---|
| 4,218,582 | A | 8/1980 | Hellman et al. |
| 4,339,134 | A | 7/1982 | Macheel |
| 4,390,898 | A | 6/1983 | Bond et al. |
| 4,405,829 | A | 9/1983 | Rivest et al. |
| 4,424,414 | A | 1/1984 | Hellman et al. |
| 4,528,588 | A | 7/1985 | Lofberg |
| 4,633,462 | A | 12/1986 | Stifle |
| 4,672,605 | A | 6/1987 | Hustig et al. |
| 4,748,668 | A | 5/1988 | Shamir et al. |
| 4,789,928 | A | 12/1988 | Fujisaki |
| 4,827,508 | A | 5/1989 | Shear |
| 4,876,617 | A | 10/1989 | Best et al. |
| 4,896,275 | A | 1/1990 | Jackson |
| 4,908,873 | A | 3/1990 | Philibert et al. |
| 4,939,515 | A | 7/1990 | Adelson |
| 4,969,204 | A | 11/1990 | Melnychuk et al. |
| 4,972,471 | A | 11/1990 | Gross et al. |
| 4,977,594 | A | 12/1990 | Shear |
| 4,979,210 | A | 12/1990 | Nagata et al. |
| 4,980,782 | A | 12/1990 | Ginkel |
| 5,050,213 | A | 9/1991 | Shear |
| 5,073,925 | A | 12/1991 | Nagata et al. |
| 5,077,665 | A | 12/1991 | Silverman et al. |
| 5,097,584 | A | 3/1992 | Cain |
| 5,111,530 | A | 5/1992 | Kutaragi |
| 5,113,437 | A | 5/1992 | Best et al. |
| 5,123,045 | A * | 6/1992 | Ostrovsky et al. ............ 713/190 |
| 5,136,581 | A | 8/1992 | Muehrcke |
| 5,136,646 | A | 8/1992 | Haber et al. |
| 5,136,647 | A | 8/1992 | Haber et al. |
| 5,142,576 | A | 8/1992 | Nadan |
| 5,161,210 | A | 11/1992 | Druyvesteyn et al. |
| 5,189,411 | A | 2/1993 | Collar |
| 5,210,820 | A | 5/1993 | Kenyon |
| 5,243,423 | A | 9/1993 | DeJean et al. |
| 5,243,515 | A | 9/1993 | Lee |
| 5,287,407 | A | 2/1994 | Holmes |
| 5,293,633 | A | 3/1994 | Robbins |
| 5,297,032 | A | 3/1994 | Trojan |
| 5,319,735 | A | 6/1994 | Preuss et al. |
| 5,327,520 | A | 7/1994 | Chen |
| 5,341,429 | A | 8/1994 | Stringer et al. |
| 5,341,477 | A | 8/1994 | Pitkin et al. |
| 5,363,448 | A | 11/1994 | Koopman et al. |
| 5,365,586 | A | 11/1994 | Indeck et al. |
| 5,369,707 | A | 11/1994 | Follendore, III |
| 5,379,345 | A | 1/1995 | Greenberg |
| 5,394,324 | A | 2/1995 | Clearwater |
| 5,398,285 | A | 3/1995 | Borgelt et al. |
| 5,406,627 | A | 4/1995 | Thompson et al. |
| 5,408,505 | A | 4/1995 | Indeck et al. |
| 5,410,598 | A | 4/1995 | Shear |
| 5,412,718 | A | 5/1995 | Narasimhalv et al. |
| 5,418,713 | A | 5/1995 | Allen |
| 5,428,606 | A | 6/1995 | Moskowitz |
| 5,437,050 | A | 7/1995 | Lamb |
| 5,450,490 | A | 9/1995 | Jensen et al. |
| 5,469,536 | A | 11/1995 | Blank |
| 5,471,533 | A | 11/1995 | Wang et al. |
| 5,478,990 | A | 12/1995 | Montanari et al. |
| 5,479,210 | A | 12/1995 | Cawley et al. |
| 5,487,168 | A | 1/1996 | Geiner et al. |
| 5,493,677 | A | 2/1996 | Balogh et al. |
| 5,497,419 | A | 3/1996 | Hill |
| 5,506,795 | A | 4/1996 | Yamakawa |
| 5,513,126 | A | 4/1996 | Harkins et al. |
| 5,513,261 | A | 4/1996 | Maher |
| 5,530,739 | A | 6/1996 | Okada |
| 5,530,751 | A | 6/1996 | Morris |
| 5,530,759 | A | 6/1996 | Braudaway et al. |
| 5,539,735 | A | 7/1996 | Moskowitz |
| 5,548,579 | A | 8/1996 | Lebrun et al. |
| 5,568,570 | A | 10/1996 | Rabbani |
| 5,579,124 | A | 11/1996 | Aijala et al. |
| 5,581,703 | A | 12/1996 | Baugher et al. |
| 5,583,488 | A | 12/1996 | Sala et al. |
| 5,598,470 | A | 1/1997 | Cooper et al. |
| 5,606,609 | A | 2/1997 | Houser et al. |
| 5,613,004 | A | 3/1997 | Cooperman et al. |
| 5,617,119 | A | 4/1997 | Briggs et al. |
| 5,617,506 | A | 4/1997 | Burk |
| 5,625,690 | A | 4/1997 | Michel et al. |
| 5,629,980 | A | 5/1997 | Stefik et al. |
| 5,633,932 | A | 5/1997 | Davis et al. |
| 5,634,040 | A | 5/1997 | Her et al. |
| 5,636,276 | A | 6/1997 | Brugger |
| 5,636,292 | A | 6/1997 | Rhoads |
| 5,640,569 | A | 6/1997 | Miller et al. |
| 5,644,727 | A | 7/1997 | Atkins |
| 5,646,997 | A | 7/1997 | Barton |
| 5,649,284 | A | 7/1997 | Yoshinobu |
| 5,657,461 | A | 8/1997 | Harkins et al. |
| 5,659,726 | A | 8/1997 | Sandford, II et al. |
| 5,664,018 | A | 9/1997 | Leighton |
| 5,673,316 | A | 9/1997 | Auerbach et al. |
| 5,675,653 | A | 10/1997 | Nelson |
| 5,677,952 | A | 10/1997 | Blakley et al. |
| 5,680,462 | A | 10/1997 | Miller et al. |
| 5,687,236 | A | 11/1997 | Moskowitz et al. |
| 5,689,587 | A | 11/1997 | Bender et al. |
| 5,696,828 | A | 12/1997 | Koopman, Jr. |
| 5,719,937 | A | 2/1998 | Warren et al. |
| 5,721,781 | A | 2/1998 | Deo |
| 5,721,788 | A | 2/1998 | Powell et al. |
| 5,734,752 | A | 3/1998 | Knox |
| 5,737,416 | A | 4/1998 | Cooper et al. |
| 5,737,733 | A | 4/1998 | Eller |
| 5,740,244 | A | 4/1998 | Indeck et al. |
| 5,745,569 | A | 4/1998 | Moskowitz et al. |
| 5,748,783 | A | 5/1998 | Rhoads |
| 5,751,811 | A | 5/1998 | Magnotti et al. |
| 5,754,697 | A | 5/1998 | Fu et al. |
| 5,754,938 | A | 5/1998 | Herz |
| 5,757,923 | A | 5/1998 | Koopman, Jr. |
| 5,765,152 | A | 6/1998 | Erickson |
| 5,768,396 | A | 6/1998 | Sone |
| 5,774,452 | A | 6/1998 | Wolosewicz |
| 5,781,184 | A | 7/1998 | Wasserman |
| 5,790,677 | A | 8/1998 | Fox et al. |
| 5,799,083 | A | 8/1998 | Brothers et al. |
| 5,809,139 | A | 9/1998 | Girod et al. |
| 5,809,160 | A | 9/1998 | Powell et al. |
| 5,818,818 | A | 10/1998 | Soumiya |
| 5,822,432 | A | 10/1998 | Moskowitz et al. |
| 5,822,436 | A | 10/1998 | Rhoads |
| 5,828,325 | A | 10/1998 | Wolosewicz et al. |
| 5,832,119 | A | 11/1998 | Rhoads |
| 5,839,100 | A | 11/1998 | Wegener |
| 5,842,213 | A | 11/1998 | Odom |
| 5,845,266 | A | 12/1998 | Lupien |
| 5,848,155 | A | 12/1998 | Cox |
| 5,850,481 | A | 12/1998 | Rhoads |
| 5,859,920 | A | 1/1999 | Daly et al. |
| 5,860,099 | A | 1/1999 | Milios et al. |
| 5,862,260 | A | 1/1999 | Rhoads |
| 5,864,827 | A | 1/1999 | Wilson |
| 5,870,474 | A | 2/1999 | Wasilewski et al. |
| 5,875,437 | A | 2/1999 | Atkins |
| 5,884,033 | A | 3/1999 | Duvall et al. |
| 5,889,868 | A | 3/1999 | Moskowitz et al. |
| 5,892,900 | A | 4/1999 | Ginter |
| 5,893,067 | A | 4/1999 | Bender et al. |
| 5,894,521 | A | 4/1999 | Conley |
| 5,901,178 | A | 5/1999 | Lee |
| 5,903,721 | A | 5/1999 | Sixtus |
| 5,905,800 | A | 5/1999 | Moskowitz et al. |
| 5,905,975 | A | 5/1999 | Ausubel |
| 5,912,972 | A | 6/1999 | Barton |
| 5,915,027 | A | 6/1999 | Cox et al. |
| 5,917,915 | A | 6/1999 | Hirose |
| 5,918,223 | A | 6/1999 | Blum |
| 5,920,900 | A | 7/1999 | Poole et al. |
| 5,923,763 | A | 7/1999 | Walker et al. |
| 5,930,369 | A | 7/1999 | Cox et al. |

(56) References Cited

U.S. PATENT DOCUMENTS

| | | |
|---|---|---|
| 5,930,377 A | 7/1999 | Powell et al. |
| 5,940,134 A | 8/1999 | Wirtz |
| 5,943,422 A | 8/1999 | Van Wie et al. |
| 5,949,055 A | 9/1999 | Fleet |
| 5,949,973 A | 9/1999 | Yarom |
| 5,963,909 A | 10/1999 | Warren et al. |
| 5,973,731 A | 10/1999 | Schwab |
| 5,974,141 A | 10/1999 | Saito |
| 5,991,426 A | 11/1999 | Cox et al. |
| 5,999,217 A | 12/1999 | Berners-Lee |
| 6,009,176 A | 12/1999 | Gennaro et al. |
| 6,029,126 A | 2/2000 | Malvar |
| 6,029,146 A | 2/2000 | Hawkins |
| 6,029,195 A | 2/2000 | Herz |
| 6,032,957 A | 3/2000 | Kiyosaki |
| 6,035,398 A | 3/2000 | Bjorn |
| 6,041,316 A | 3/2000 | Allen |
| 6,044,471 A | 3/2000 | Colvin |
| 6,049,838 A | 4/2000 | Miller et al. |
| 6,051,029 A | 4/2000 | Paterson et al. |
| 6,061,793 A | 5/2000 | Tewfik et al. |
| 6,067,622 A | 5/2000 | Moore |
| 6,069,914 A | 5/2000 | Cox |
| 6,078,664 A | 6/2000 | Moskowitz et al. |
| 6,081,251 A | 6/2000 | Sakai et al. |
| 6,081,587 A | 6/2000 | Reyes et al. |
| 6,081,597 A | 6/2000 | Hoffstein |
| 6,088,455 A | 7/2000 | Logan et al. |
| 6,108,722 A | 8/2000 | Troeller |
| 6,131,162 A | 10/2000 | Yoshiura et al. |
| 6,134,535 A | 10/2000 | Belzberg |
| 6,141,753 A | 10/2000 | Zhao et al. |
| 6,141,754 A | 10/2000 | Choy |
| 6,148,333 A | 11/2000 | Guedalia |
| 6,154,571 A | 11/2000 | Cox et al. |
| 6,173,322 B1 | 1/2001 | Hu |
| 6,178,405 B1 | 1/2001 | Ouyang |
| 6,185,683 B1 | 2/2001 | Ginter |
| 6,192,138 B1 | 2/2001 | Yamadaji |
| 6,199,058 B1 | 3/2001 | Wong et al. |
| 6,205,249 B1 | 3/2001 | Moskowitz |
| 6,208,745 B1 | 3/2001 | Florenio et al. |
| 6,226,618 B1 | 5/2001 | Downs |
| 6,230,268 B1 | 5/2001 | Miwa et al. |
| 6,233,347 B1 | 5/2001 | Chen et al. |
| 6,233,566 B1 | 5/2001 | Levine |
| 6,233,684 B1 | 5/2001 | Stefik et al. |
| 6,240,121 B1 | 5/2001 | Senoh |
| 6,253,193 B1 | 6/2001 | Ginter |
| 6,263,313 B1 | 7/2001 | Milsted et al. |
| 6,272,474 B1 | 8/2001 | Garcia |
| 6,272,535 B1 | 8/2001 | Iwamura |
| 6,272,634 B1 | 8/2001 | Tewfik et al. |
| 6,275,988 B1 | 8/2001 | Nagashima et al. |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,317,728 B1 | 11/2001 | Kane |
| 6,330,335 B1 | 12/2001 | Rhoads |
| 6,330,672 B1 | 12/2001 | Shur |
| 6,345,100 B1 | 2/2002 | Levine |
| 6,351,765 B1 | 2/2002 | Pietropaolo et al. |
| 6,363,483 B1 | 3/2002 | Keshav |
| 6,363,488 B1 | 3/2002 | Ginter |
| 6,373,892 B1 | 4/2002 | Ichien et al. |
| 6,373,960 B1 | 4/2002 | Conover et al. |
| 6,374,036 B1 | 4/2002 | Ryan et al. |
| 6,377,625 B1 | 4/2002 | Kim |
| 6,381,618 B1 | 4/2002 | Jones et al. |
| 6,381,747 B1 | 4/2002 | Wonfor et al. |
| 6,385,324 B1 | 5/2002 | Koppen |
| 6,385,329 B1 | 5/2002 | Sharma et al. |
| 6,385,596 B1 | 5/2002 | Wiser |
| 6,389,402 B1 | 5/2002 | Ginter |
| 6,389,538 B1 | 5/2002 | Gruse et al. |
| 6,398,245 B1 | 6/2002 | Gruse |
| 6,405,203 B1 | 6/2002 | Collart |
| 6,415,041 B1 | 7/2002 | Oami et al. |
| 6,418,421 B1 | 7/2002 | Hurtado |
| 6,425,081 B1 | 7/2002 | Iwamura |
| 6,427,140 B1 | 7/2002 | Ginter |
| 6,430,301 B1 | 8/2002 | Petrovic |
| 6,430,302 B2 | 8/2002 | Rhoads |
| 6,442,283 B1 | 8/2002 | Tewfik et al. |
| 6,446,211 B1 | 9/2002 | Colvin |
| 6,453,252 B1 | 9/2002 | Laroche |
| 6,457,058 B1 | 9/2002 | Ullum et al. |
| 6,463,468 B1 | 10/2002 | Buch et al. |
| 6,480,937 B1 | 11/2002 | Vorbach |
| 6,480,963 B1 | 11/2002 | Tachibana |
| 6,484,153 B1 | 11/2002 | Walker |
| 6,484,264 B1 | 11/2002 | Colvin |
| 6,493,457 B1 | 12/2002 | Quackenbush et al. |
| 6,502,195 B1 | 12/2002 | Colvin |
| 6,510,513 B1 | 1/2003 | Danieli |
| 6,522,767 B1 | 2/2003 | Moskowitz et al. |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,539,475 B1 | 3/2003 | Cox et al. |
| 6,556,976 B1 | 4/2003 | Callen |
| 6,557,103 B1 | 4/2003 | Boncelet, Jr. et al. |
| 6,574,608 B1 | 6/2003 | Dahod |
| 6,584,125 B1 | 6/2003 | Katto |
| 6,587,837 B1 | 7/2003 | Spagna et al. |
| 6,590,996 B1 | 7/2003 | Reed |
| 6,594,643 B1 | 7/2003 | Freeny |
| 6,598,162 B1 | 7/2003 | Moskowitz |
| 6,601,044 B1 | 7/2003 | Wallman |
| 6,606,393 B1 | 8/2003 | Xie et al. |
| 6,611,599 B2 | 8/2003 | Natarajan |
| 6,618,188 B2 | 9/2003 | Haga |
| 6,647,424 B1 | 11/2003 | Pearson et al. |
| 6,658,010 B1 | 12/2003 | Enns et al. |
| 6,665,489 B2 | 12/2003 | Collart |
| 6,668,246 B1 | 12/2003 | Yeung et al. |
| 6,668,325 B1 | 12/2003 | Collberg et al. |
| 6,674,858 B1 | 1/2004 | Kimura |
| 6,687,683 B1 | 2/2004 | Harada et al. |
| 6,725,372 B1 | 4/2004 | Lewis et al. |
| 6,754,822 B1 | 6/2004 | Zhao |
| 6,775,772 B1 | 8/2004 | Binding et al. |
| 6,778,968 B1 | 8/2004 | Gulati |
| 6,784,354 B1 | 8/2004 | Lu et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,804,453 B1 | 10/2004 | Sasamoto |
| 6,813,717 B2 | 11/2004 | Colvin |
| 6,813,718 B2 | 11/2004 | Colvin |
| 6,823,455 B1 | 11/2004 | Macy et al. |
| 6,834,308 B1 | 12/2004 | Ikezoye et al. |
| 6,839,686 B1 | 1/2005 | Galant |
| 6,842,862 B2 | 1/2005 | Chow et al. |
| 6,853,726 B1 | 2/2005 | Moskowitz et al. |
| 6,856,967 B1 | 2/2005 | Woolston |
| 6,857,078 B2 | 2/2005 | Colvin |
| 6,865,747 B1 | 3/2005 | Mercier |
| 6,876,982 B1 | 4/2005 | Lancaster |
| 6,931,534 B1 | 8/2005 | Jandel et al. |
| 6,950,941 B1 | 9/2005 | Lee |
| 6,957,330 B1 | 10/2005 | Hughes |
| 6,966,002 B1 | 11/2005 | Torrubia-Saez |
| 6,968,337 B2 | 11/2005 | Wold |
| 6,977,894 B1 | 12/2005 | Achilles et al. |
| 6,978,370 B1 | 12/2005 | Kocher |

(56) References Cited

U.S. PATENT DOCUMENTS

| | | |
|---|---|---|
| 6,983,058 B1 | 1/2006 | Fukuoka |
| 6,986,063 B2 | 1/2006 | Colvin |
| 6,990,453 B2 | 1/2006 | Wang |
| 7,003,480 B2 | 2/2006 | Fox |
| 7,007,166 B1 | 2/2006 | Moskowitz et al. |
| 7,020,285 B1 | 3/2006 | Kirovski et al. |
| 7,035,049 B2 | 4/2006 | Yamamoto |
| 7,035,409 B1 | 4/2006 | Moskowitz |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,095,715 B2 | 8/2006 | Buckman |
| 7,095,874 B2 | 8/2006 | Moskowitz et al. |
| 7,103,184 B2 | 9/2006 | Jian |
| 7,107,451 B2 | 9/2006 | Moskowitz |
| 7,123,718 B1 | 10/2006 | Moskowitz et al. |
| 7,127,615 B2 | 10/2006 | Moskowitz |
| 7,150,003 B2 | 12/2006 | Naumovich et al. |
| 7,152,162 B2 | 12/2006 | Moskowitz et al. |
| 7,159,116 B2 | 1/2007 | Moskowitz |
| 7,162,642 B2 | 1/2007 | Schumann et al. |
| 7,177,429 B2 | 2/2007 | Moskowitz et al. |
| 7,177,430 B2 | 2/2007 | Kim |
| 7,206,649 B2 | 4/2007 | Kirovski et al. |
| 7,231,524 B2 | 6/2007 | Burns |
| 7,233,669 B2 | 6/2007 | Candelore |
| 7,240,210 B2 | 7/2007 | Mihcak et al. |
| 7,266,697 B2 | 9/2007 | Kirovski et al. |
| 7,286,451 B2 | 10/2007 | Wirtz |
| 7,287,275 B2 | 10/2007 | Moskowitz |
| 7,289,643 B2 | 10/2007 | Brunk et al. |
| 7,310,815 B2 | 12/2007 | Yanovsky |
| 7,343,492 B2 | 3/2008 | Moskowitz et al. |
| 7,346,472 B1 | 3/2008 | Moskowitz et al. |
| 7,362,775 B1 | 4/2008 | Moskowitz |
| 7,363,278 B2 | 4/2008 | Schmelzer et al. |
| 7,409,073 B2 | 8/2008 | Moskowitz et al. |
| 7,444,506 B1 | 10/2008 | Datta |
| 7,457,962 B2 | 11/2008 | Moskowitz |
| 7,460,994 B2 | 12/2008 | Herre et al. |
| 7,475,246 B1 | 1/2009 | Moskowitz |
| 7,530,102 B2 | 5/2009 | Moskowitz |
| 7,532,725 B2 | 5/2009 | Moskowitz et al. |
| 7,568,100 B1 | 7/2009 | Moskowitz et al. |
| 7,630,379 B2 | 12/2009 | Morishita |
| 7,647,502 B2 | 1/2010 | Moskowitz |
| 7,647,503 B2 | 1/2010 | Moskowitz |
| 7,664,263 B2 | 2/2010 | Moskowitz |
| 7,719,966 B2 | 5/2010 | Luft |
| 7,743,001 B1 | 6/2010 | Vermeulen |
| 7,761,712 B2 | 7/2010 | Moskowitz |
| 7,779,261 B2 | 8/2010 | Moskowitz |
| 8,095,949 B1 | 1/2012 | Hendricks |
| 8,121,343 B2 | 2/2012 | Moskowitz |
| 8,161,286 B2 | 4/2012 | Moskowitz |
| 8,179,846 B2 | 5/2012 | Dolganow |
| 8,214,175 B2 | 7/2012 | Moskowitz |
| 8,265,278 B2 | 9/2012 | Moskowitz |
| 8,307,213 B2 | 11/2012 | Moskowitz |
| 8,400,566 B2 | 3/2013 | Terry |
| 2001/0010078 A1 | 7/2001 | Moskowitz |
| 2001/0029580 A1 | 10/2001 | Moskowitz |
| 2010/0029580 A1 | 10/2001 | Moskowitz |
| 2001/0043594 A1 | 11/2001 | Ogawa et al. |
| 2002/0009208 A1 | 1/2002 | Alattar |
| 2002/0010684 A1 | 1/2002 | Moskowitz |
| 2002/0026343 A1 | 2/2002 | Duenke |
| 2002/0047873 A1 | 4/2002 | Imanaka |
| 2002/0056041 A1 | 5/2002 | Moskowitz |
| 2002/0057651 A1 | 5/2002 | Roberts |
| 2002/0069174 A1 | 6/2002 | Fox |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0152179 A1 | 10/2002 | Racov |
| 2002/0161741 A1 | 10/2002 | Wang et al. |
| 2002/0188570 A1 | 12/2002 | Holliman |
| 2003/0002862 A1 | 1/2003 | Rodriguez |
| 2003/0005780 A1 | 1/2003 | Hansen |
| 2003/0023852 A1 | 1/2003 | Wold |
| 2003/0027549 A1 | 2/2003 | Kiel |
| 2003/0033321 A1 | 2/2003 | Schrempp |
| 2003/0055780 A1 | 3/2003 | Hansen |
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0086119 A1 | 5/2004 | Moskowitz |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |
| 2004/0128514 A1 | 7/2004 | Rhoads |
| 2004/0225894 A1 | 11/2004 | Colvin |
| 2004/0243540 A1 | 12/2004 | Moskowitz et al. |
| 2005/0135615 A1 | 6/2005 | Moskowitz et al. |
| 2005/0160271 A9 | 7/2005 | Brundage et al. |
| 2005/0177727 A1 | 8/2005 | Moskowitz et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2006/0101269 A1 | 5/2006 | Moskowitz et al. |
| 2006/0140403 A1 | 6/2006 | Moskowitz |
| 2006/0251291 A1 | 11/2006 | Rhoads |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0083467 A1 | 4/2007 | Lindahl et al. |
| 2007/0110240 A1 | 5/2007 | Moskowitz et al. |
| 2007/0113094 A1 | 5/2007 | Moskowitz et al. |
| 2007/0127717 A1 | 6/2007 | Herre et al. |
| 2007/0226506 A1 | 9/2007 | Moskowitz |
| 2007/0253594 A1 | 11/2007 | Lu et al. |
| 2007/0294536 A1 | 12/2007 | Moskowitz et al. |
| 2007/0300072 A1 | 12/2007 | Moskowitz |
| 2007/0300073 A1 | 12/2007 | Moskowitz |
| 2008/0005571 A1 | 1/2008 | Moskowitz |
| 2008/0005572 A1 | 1/2008 | Moskowitz |
| 2008/0016365 A1 | 1/2008 | Moskowitz |
| 2008/0022113 A1 | 1/2008 | Moskowitz |
| 2008/0022114 A1 | 1/2008 | Moskowitz |
| 2008/0028222 A1 | 1/2008 | Moskowitz |
| 2008/0046742 A1 | 2/2008 | Moskowitz |
| 2008/0075277 A1 | 3/2008 | Moskowitz et al. |
| 2008/0109417 A1 | 5/2008 | Moskowitz |
| 2008/0133927 A1 | 6/2008 | Moskowitz et al. |
| 2008/0151934 A1 | 6/2008 | Moskowitz et al. |
| 2009/0037740 A1 | 2/2009 | Moskowitz |
| 2009/0089427 A1 | 4/2009 | Moskowitz et al. |
| 2009/0190754 A1 | 7/2009 | Moskowitz et al. |
| 2009/0210711 A1 | 8/2009 | Moskowitz |
| 2009/0220074 A1 | 9/2009 | Moskowitz et al. |
| 2009/0002904 A1 | 1/2010 | Moskowitz |
| 2010/0005308 A1 | 1/2010 | Moskowitz |
| 2010/0064140 A1 | 3/2010 | Moskowitz |
| 2010/0077219 A1 | 3/2010 | Moskowitz |
| 2010/0077220 A1 | 3/2010 | Moskowitz |
| 2010/0098251 A1 | 4/2010 | Moskowitz |
| 2010/0106736 A1 | 4/2010 | Moskowitz |
| 2010/0153734 A1 | 6/2010 | Moskowitz |
| 2010/0182570 A1 | 7/2010 | Matsumoto |

(56) References Cited

U.S. PATENT DOCUMENTS

| | | | |
|---|---|---|---|
| 2010/0202607 | A1 | 8/2010 | Moskowitz |
| 2010/0220861 | A1 | 9/2010 | Moskowitz |
| 2010/0313033 | A1 | 12/2010 | Moskowitz |
| 2011/0019691 | A1 | 1/2011 | Moskowitz |
| 2011/0069864 | A1 | 3/2011 | Moskowitz |
| 2011/0128445 | A1 | 6/2011 | Carrieres |
| 2012/0057012 | A1 | 3/2012 | Sitrick |
| 2013/0145058 | A1 | 6/2013 | Shuholm |

FOREIGN PATENT DOCUMENTS

| | | |
|---|---|---|
| EP | 0581317 | 2/1994 |
| EP | 0581317 A2 | 2/1994 |
| EP | 0649261 | 4/1995 |
| EP | 0651554 | 5/1995 |
| EP | 0872073 | 7/1996 |
| EP | 1547337 | 3/2006 |
| EP | 1354276 | 12/2007 |
| NL | 1005523 | 9/1998 |
| WO | WO 9514289 | 5/1995 |
| WO | WO 9629795 | 9/1996 |
| WO | WO 9642151 | 12/1996 |
| WO | WO9701892 | 1/1997 |
| WO | WO9726733 | 1/1997 |
| WO | WO 9724833 | 7/1997 |
| WO | WO9726732 | 7/1997 |
| WO | WO 9744736 | 11/1997 |
| WO | WO9802864 | 1/1998 |
| WO | WO9837513 | 8/1998 |
| WO | WO 9952271 | 10/1999 |
| WO | WO 9962044 | 12/1999 |
| WO | WO 9963443 | 12/1999 |
| WO | WO 0057643 | 9/2000 |
| WO | WO0118628 | 3/2001 |
| WO | WO0143026 | 6/2001 |
| WO | WO0203385 | 1/2002 |
| WO | WO02003385 A1 | 10/2002 |

OTHER PUBLICATIONS

Staind (The Singles 1996-2006), Warner Music—Atlantic, Pre-Release CD image, 2006, 1 page.
Cayre, et al., "Kerckhoffs-Based Embedding Security Classes for WOA Data Hiding", IEEE Transactions on Information Forensics and Security, vol. 3 No. 1, Mar. 2008, 15 pp.
Wayback Machine, dated Aug. 26, 2007, http://web.archive,org/web/20070826151732/http://www.screenplaysmag.com/t-abid/96/articleType/ArticleView/articleId/495/Default.aspx/.
2012 "Address Space Layout Randomization." Wikipedia, The Free Encyclopedia. Wikimedia Foundation, Inc . . . Aug. 28, 2012 http://en.wikipedia.org/wiki/ASLR.
Schneier, Bruce, Applied Cryptography, 2nd Ed., John Wiley & Sons, pp. 9-10, 1996.
Menezes, Alfred J., Handbook of Applied Cryptography, CRC Press, p. 46, 1997.
Merriam-Webster's Collegiate Dictionary, 10th Ed., Merriam Webster, Inc., p. 207.
Brealy, et al., Principles of Corporate Finance, "Appendix A—Using Option Valuation Models", 1984, pp. 448-449.
Copeland, et al., Real Options: A Practitioner's Guide, 2001 pp. 106-107, 201-202, 204-208.
Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.
Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.
Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.
Zhao, Jian. "A WWW Service to Embed and Prove Digital Copyright Watermarks", Proc. of the European conf. on Multimedia Applications, Services & Techniques Louvain-La-Nevve Belgium May 1996.
Gruhl, Daniel et al., Echo Hiding. In Proceeding of the Workshop on Information Hiding. No. 1174 in Lecture Notes in Computer Science, Cambridge, England (May/Jun. 1996).
Oomen, A.W.J. et al., A Variable Bit Rate Buried Data Channel for Compact Disc, J.AudioEng. Sc., vol. 43, No. 1/2, pp. 23-28 (1995).
Ten Kate, W. et al., A New Surround-Stereo-Surround Coding Techniques, J. Audio Eng.Soc., vol. 40,No. 5,pp. 376-383 (1992).
Gerzon, Michael et al., A High Rate Buried Data Channel for Audio CD, presentation notes, Audio Engineering Soc. 94th Convention (1993).
Sklar, Bernard, Digital Communications, pp. 601-603 (1988).
Jayant, N.S. et al., Digital Coding of Waveforms, Prentice Hall Inc., Englewood Cliffs, NJ, pp. 486-509 (1984).
Bender, Walter R. et al., Techniques for Data Hiding, SPIE Int. Soc. Opt. Eng., vol. 2420, pp. 164-173, 1995.
Zhao, Jian et al., Embedding Robust Labels into Images for Copyright Protection, (xp 000571976), pp. 242-251, 1995.
Menezes, Alfred J., Handbook of Applied Cryptography, CRC Press, p. 175, 1997.
Schneier, Bruce, Applied Cryptography, 1st Ed., pp. 67-68, 1994.
Ten Kate, W. et al., "Digital Audio Carrying Extra Information", IEEE, CH 2847-2/90/0000-1097, (1990).
Van Schyndel, et al., "A digital Watermark," IEEE Int'l Computer Processing Conference, Austin,TX, Nov. 13-16, 1994, pp. 86-90.
Smith, et al. "Modulation and Information Hiding in Images", Springer Verlag, 1st Int'l Workshop, Cambridge, UK, May 30-Jun. 1, 1996, pp. 207-227.
Kutter, Martin et al., "Digital Signature of Color Images Using Amplitude Modulation", SPIE-E197, vol. 3022, pp. 518-527.
Puate, Joan et al., "Using Fractal Compression Scheme to Embed a Digital Signature into an Image", SPIE-96 Proceedings, vol. 2915, Mar. 1997, pp. 108-118.
Swanson, Mitchell D.,et al., "Transparent Robust Image Watermarking", Proc. of the 1996 IEEE Int'l Conf. on Image Processing, vol. 111, 1996 , pp. 211-214.
Swanson, Mitchell D., et al. "Robust Data Hiding for Images", 7th IEEE Digital Signal Processing Workshop, Leon, Norway. Sep. 1-4, 1996, pp. 37-40.
Zhao, Jian et al., "Embedding Robust Labels into Images for Copyright Protection", Proceeding of the Know Right '95 Conference, pp. 242-251.
Koch, E., et al., "Towards Robust and Hidden Image Copyright Labeling", 1995 IEEE Workshop on Nonlinear Signal and Image Processing, Jun. 1995 Neos Marmaras pp. 4.
Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.
Cox, et al., Secure Spread Spectrum Watermarking for Multimedia, NEC Research Institute, Techinal Report 95-10, pp. 33.
Kahn, D., "The Code Breakers", The MacMillan Company, 1969, pp. xIII, 81-83, 513, 515, 522-526, 863.
Boney, et al., Digital Watermarks for Audio Signals, EVSIPCO, 96, pp. 473-480 (Mar. 14, 1997).
Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.
F. Hartung, et al., "Digital Watermarking of Raw and Compressed Video", SPIE vol. 2952, pp. 205-213.

(56) References Cited

OTHER PUBLICATIONS

Craver, et al., "Can Invisible Watermarks Resolve Rightful Ownerships?", IBM Research Report, RC 20509 (Jul. 25, 1996) 21 pp.
Press, et al., "Numerical Recipes in C", Cambridge Univ. Press, 1988, pp. 398-417.
Pohlmann, Ken C., "Principles of Digital Audio", 3rd Ed., 1995, pp. 32-37, 40-48:138, 147-149, 332, 333, 364, 499-501, 508-509, 564-571.
Pohlmann, Ken C., "Principles of Digital Audio", 2nd Ed., 1991, pp. 1-9, 19-25, 30-33, 41-48, 54-57, 86-107, 375-387.
Schneier, Bruce, Applied Cryptography, John Wiley & Sons, Inc., New York, 1994, pp. 68, 69, 387-392, 1-57, 273-275, 321-324.
Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.
Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).
Rivest, et al., "Pay Word and Micromint: Two Simple Micropayment Schemes," MIT Laboratory for Computer Science, Cambridge, MA, May 7, 1996 pp. 1-18.
Bender, et al., "Techniques for Data Hiding", IBM Systems Journal, (1996) vol. 35, Nos. 3 & 4,1996, pp. 313-336.
Moskowitz, "Bandwith as Currency", IEEE Multimedia, Jan.-Mar. 2003, pp. 14-21.
Moskowitz, Multimedia Security Technologies for Digital Rights Management, 2006, Academic Press, "Introduction—Digital Rights Management" pp. 3-22.
Rivest, et al., "PayWord and Micromint: Two Simple Micropayment Schemes," MIT Laboratory for Computer Science, Cambridge, MA, Apr. 27, 2001, pp. 1-18.
Tomsich, et al., "Towards a secure and de-centralized digital watermarking infrastructure for the protection of Intellectual Property", in Electronic Commerce and Web Technologies, Proceedings (ECWEB)(2000).
Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.
Lemma, et al. "Secure Watermark Embedding through Partial Encryption", International Workshop on Digital Watermarking ("IWDW" 2006). Springer Lecture Notes in Computer Science 2006 (to appear) 13.
Kocher, et al., "Self Protecting Digital Content", Technical Report from the CRI Content Security Research Initiative, Cryptography Research, Inc. 2002-2003 14 pages.
Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.
Schunter, M. et al., "A Status Report on the Semper framework for Secure Electronic Commerce", Computer Networks and ISDN Systems, Sep. 30, 1998, pp. 1501-1510 vol. 30 No. 16-18 NL North Holland.
Konrad, K. et al., "Trust and Electronic Commerce—more than a technical problem," Proceedings of the 18th IEEE Symposium on Reliable Distributed Systems Oct. 19-22, 1999, pp. 360-365 Lausanne.
Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.
Steinauer D. D., et al., "Trust and Traceability in Electronic Commerce", Standard View, Sep. 1997, pp. 118-124, vol. 5 No. 3, ACM, USA.
Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.
European Search Report & European Search Opinion in EP07112420.

Staind (The Singles 1996-2006), Warner Music--Atlantic, Pre-Release Cd image, 2006, 1 page.
Radiohead ("Hail to the Thief"), EMI Music Group—Capitol, Pre-Release CD image, 2003, 1 page.
U.S. Appl. No. 60/169,274, filed Dec. 7, 1999, entitled "Systems, Methods and Devices for Trusted Transactions".
U.S. Appl. No. 60/234,199, filed Sep. 20, 2000, "Improved Security Based on Subliminal and Supraliminal Channels for Data Objects".
U.S. Appl. No. 09/671,739, filed Sep. 29, 2000, entitled "Method and Device for Monitoring and Analyzing Signals".
Tirkel, A.Z., "A Two-Dimensional Digital Watermark", Scientific Technology, 686, 14, date unknown. (citation revised upon review on Nov. 16, 2010 by RAN.).
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb. 1, 1996, pp. 99-110.
Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
Oasis (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP5002 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoff's-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26,6 2007, http://web.archive,org/web/20070826151732/http://www.screenplaysmag.com/t-abid/96/articleType/ArticleView/articleId/495/Defaultaspx/.
"YouTube Copyright Policy: Video Identification tool—YouTube Help", accessed Jun. 4, 2009, http://www.google.com/support/youtube/bin/answer.py?hl=en&answer=83766, 3 pp.

(56) References Cited

OTHER PUBLICATIONS

PCT Application No. PCT/US00/18411, filed Jul. 5, 2000, entitled, "Copy Protection of Digital Data Combining Steganographic and Cryptographic Techniques".
U.S. Appl. No. 60/222,023, filed Jul. 31, 2007 entitled "Method and apparatus for recognizing sound and signals in high noise and distortion".
"Techniques for Data Hiding in Audio Files," by Morimoto, 1995.
Howe, Dennis Jul. 13, 1998 http://foldoc..org//steganography.
CSG, Computer Support Group and CSGNetwork.com 1973 http://www.csgnetwork.com/glossarys.html.
QuinStreet Inc. 2010 What is steganography?—A word definition from the Webopedia Computer Dictionary http://www.webopedia.com/terms/steganography.html.
Graham, Robert Aug. 21, 2000 "Hacking Lexicon" http://robertgraham.com/pubs/hacking-dict.html.
Farkex, Inc 2010 "Steganography definition of steganography in the Free Online Encyclopedia" http://encyclopedia2.Thefreedictionary.com/steganography.
Horowitz, et al., The Art of Eletronics. $2^{nd}$ Ed., 1989, pp. 7.
Jimmy eat world ("futures"), Interscope Records, Pre-Release CD image, 2004, 1 page.
Aerosmith ("Just Push Play"), Pre-Release CD image, 2001, 1 page.
Phil Collins(Testify) Atlantic, Pre-Release CD image, 2002, 1 page.
U. are U. Reviewer's Guide (U are U Software, 1998).
U. are U. wins top honors!—Marketing Flyer (U. are U. Software, 1998).
Digital Persona, Inc., *U. are U. Fingerprint Recognition System: User Guide* (Version 1.0, 1998).
Digital Persona White Paper pp. 8-9 published Apr. 15, 1998.
Digital Persona, Inc., "Digital Persona Releases U. are. U Pro Fingerprint Security Systems for Windows NT, 2000, '98, '95", (Feb. 2000 ).
SonicWall, Inc. 2011 "The Network Security SonicOS Platform-Deep Packet Inspection" http://www.sonicwall.com/us/en/products/Deep_Packet_Inspection.html.
Rick Merritt, PARC hosts summit on content-centric nets, EETimes, Aug. 12, 2011, http://www.eetimes.com/electronics-news/4218741/Parc-hosts-summit-on-content-centric-nets.
Afanasyev, et. al., Communications of the ACM: Privacy Preserving Network Forensics 2011.
SonicWall, Inc., 2008 "The Advantages of a Multi-core Architecture in Network Security Appliances" http://www.sonicwall.com/downloads/Wp-ENG-010_Multicore . . .
Voip-Pal.Com Inc's Lawful Intercept Patent Application Receives the Allowance for Issuance as a Patent, http://finance.yahoo.com/news/voip-pal-com-inc-lawful-133000133.html.
Deep Content Inspection—Wikipedia, the free encyclopedia, http://en.wikipedia.org/wiki/Deep_content_inspection (last visited Apr. 4, 2013).
Dexter, et. al, "Multi-view Synchronization of Human Actions and Dynamic Scenes" pp. 1-11, 2009.
Kudrle, et al., "Fingerprinting for Solving A/V Synchronization Issues within Broadcast Environments", 2011.
Junego, et. al., "View-Independent Action Recognition from Temporal Self-Similarities", 2011.
Dexter, et al., "Multi-view Synchronization of Image Sequences", 2009.
*Blue Spike, LLC.* v. *Texas Instruments, Inc* et. al, (No: 6:12CV-499-MHS), Audible Magic Corporations's amended Answer ( E.D. TX filed Jul. 15, 2013) (Document 885 p. ID 9581), (PACER).
Moskowitz, "Introduction-Digital Rights Management," Multimedia Security Technologies for Digital Rights Management (2006), Elsevier.
George, Mercy; Chouinard, Jean-Yves; Georgana, Nicolas. Digital Watermarking of Images and video using Direct Sequence Spread Spectrum Techniques. 1999 IEEE Canadian Conference on Electrical and Computer Engineering vol. 1. Pub. Date: 1999 Relevant pp. 116-121. http://ieeexplore.ieee.org/stamp/stamp.jsp?tp=arnumber=807181.
Shazam Entertainment Limited's Amended Answer to Blue Spike, LLC's complaint and counterclaims against Blue Spike LLC, Blue Spike, Inc and Scott A. Moskowitz , *Shazam Entertainment Ltd* v. *Blue Spike, LLC, Blue Spike, Inc, and Scott Moskowitz* (E.D.T.X Dist Ct.) Case No. 6:12-CV-00499-MHS.
Audible Magic Corporation's Second Amended Answer to Blue Spike LLC's Original Complaint for patent infringement and counterclaims against Blue Spike LLC, Blue Spike, Inc and Scott Moskowitz. *Blue Spike LLC* v. *Texas Instruments, Audible Magic Corporation* (E.D.T.X Dist Ct.) Case No. 6:12-CV-499-MHS.

\* cited by examiner

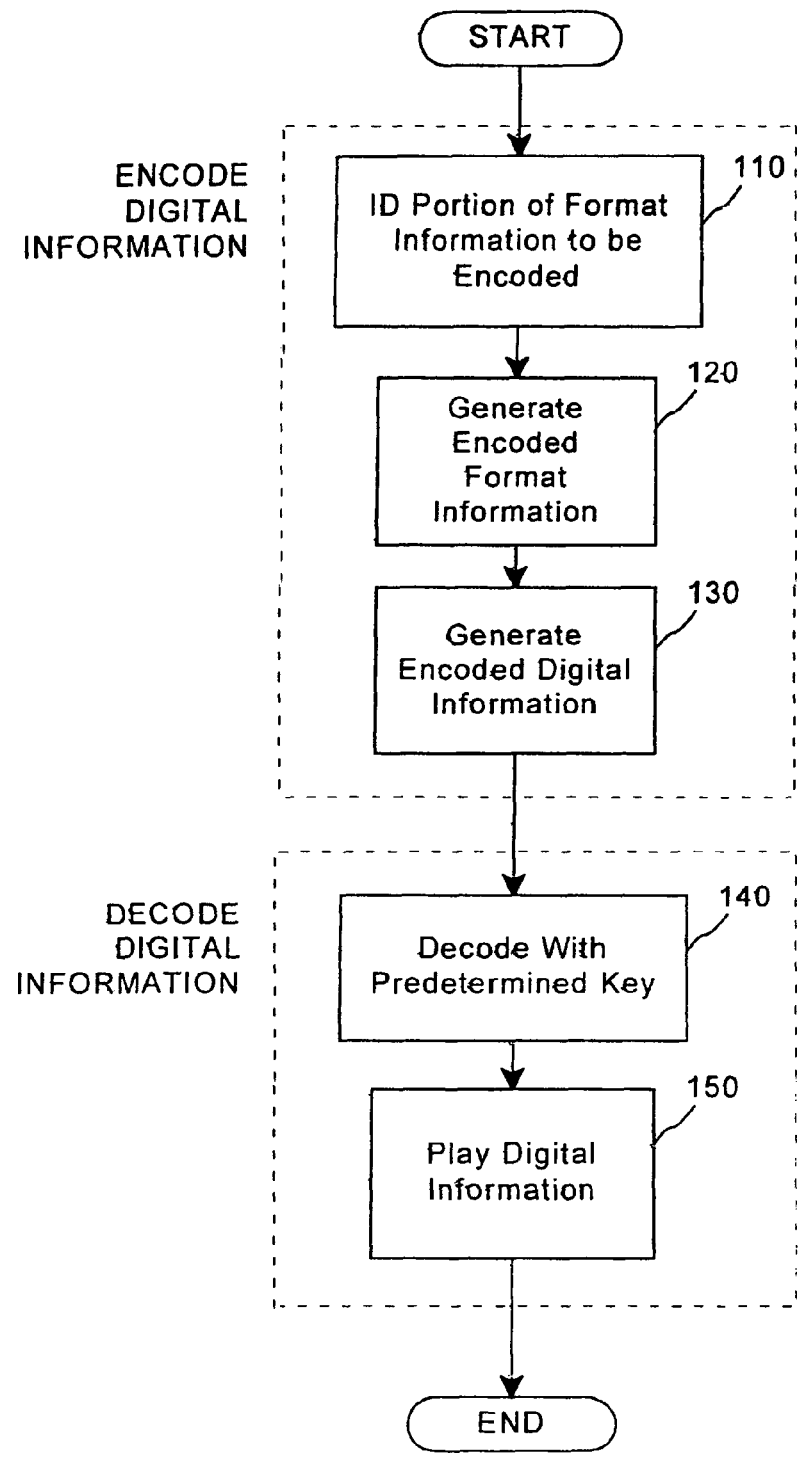

DATA PROTECTION METHOD AND DEVICE

CROSS-REFERENCE TO RELATED APPLICATIONS

This application is a continuation of U.S. application Ser. No. 11/895,388, filed Aug. 24, 2007, which is a division of U.S. patent application Ser. No. 10/602,777, filed Jun. 25, 2003, issued Feb. 16, 2010 as U.S. Pat. No. 7,664,263, which is a continuation of U.S. patent application Ser. No. 09/046,627, filed Mar. 24, 1998, issued Jul. 22, 2003, as U.S. Pat. No. 6,598,162. The entire disclosure of U.S. application ser. No. 11/895,388, filed Aug. 24, 2007, U.S. patent application Ser. No. 09/046,627, issued Jul. 22, 2003, as U.S. Pat. No. 6,598,162, and U.S. patent application Ser. No. 08/587,943, filed Jan. 17, 1996, issued Apr. 28, 1998, as U.S. Pat. No. 5,745,569 are hereby incorporated by reference in their entireties.

FIELD OF THE INVENTION

The invention relates to the protection of digital information. More particularly, the invention relates to a method and device for data protection.

With the advent of computer networks and digital multimedia, protection of intellectual property has become a prime concern for creators and publishers of digitized copies of copyrightable works, such as musical recordings, movies, video games, and computer software. One method of protecting copyrights in the digital domain is to use "digital watermarks."

The prior art includes copy protection systems attempted at many stages in the development of the software industry. These may be various methods by which a software engineer can write the software in a clever manner to determine if it has been copied, and if so to deactivate itself. Also included are undocumented changes to the storage format of the content. Copy protection was generally abandoned by the software industry, since pirates were generally just as clever as the software engineers and figured out ways to modify the software and deactivate the protection. The cost of developing such protection was not justified considering the level of piracy which occurred despite the copy protection.

Other methods for protection of computer software include the requirement of entering certain numbers or facts that may be included in a packaged software's manual, when prompted at start-up. These may be overcome if copies of the manual are distributed to unintended users, or by patching the code to bypass these measures. Other methods include requiring a user to contact the software vendor and to receive "keys" for unlocking software after registration attached to some payment scheme, such as credit card authorization. Further methods include network-based searches of a user's hard drive and comparisons between what is registered to that user and what is actually installed on the user's general computing device. Other proposals, by such parties as AT&T's Bell Laboratories, use "kerning" or actual distance in pixels, in the rendering of text documents, rather than a varied number of ASCII characters. However, this approach can often be defeated by graphics processing analogous to sound processing, which randomizes that information. All of these methods require outside determination and verification of the validity of the software license.

Digital watermarks can be used to mark each individual copy of a digitized work with information identifying the title, copyright holder, and even the licensed owner of a particular copy. When marked with licensing and ownership information, responsibility is created for individual copies where before there was none. Computer application programs can be watermarked by watermarking digital content resources used in conjunction with images or audio data Digital watermarks can be encoded with random or pseudo random keys, which act as secret maps for locating the watermarks. These keys make it impossible for a party to find the watermark without having the key. In addition, the encoding method can be enhanced to force a party to cause damage to a watermarked data stream when trying to erase a random-key watermark. Other information is disclosed in "Technology: Digital Commerce", Denise Caruso, New York Times, Aug. 7, 1995; and "Copyrighting in the Information Age", Harley Ungar, ONLINE MARKETPLACE, September 1995, Jupiter Communications.

Additionally, other methods for hiding information signals in content signals, are disclosed in U.S. Pat. No. 5,319,735—Preuss et al. and U.S. Pat. No. 5,379,345—Greenberg.

It is desirable to use a "stega-cipher" or watermarking process to hide the necessary parts or resources of the executable object code in the digitized sample resources. It is also desirable to further modify the underlying structure of an executable computer application such that it is more resistant to attempts at patching and analysis by memory capture. A computer application seeks to provide a user with certain utilities or tools, that is, users interact with a computer or similar device to accomplish various tasks and applications provide the relevant interface. Thus, a level of authentication can also be introduced into software, or "digital products," that include digital content, such as audio, video, pictures or multimedia, with digital watermarks. Security is maximized because erasing this code watermark without a key results in the destruction of one or more essential parts of the underlying application, rendering the "program" useless to the unintended user who lacks the appropriate key. Further, if the key is linked to a license code by means of a mathematical function, a mechanism for identifying the licensed owner of an application is created.

It is also desirable to randomly reorganize program memory structure intermittently during program run time, to prevent attempts at memory capture or object code analysis aimed at eliminating licensing or ownership information, or otherwise modifying, in an unintended manner, the functioning of the application.

In this way, attempts to capture memory to determine underlying functionality or provide a "patch" to facilitate unauthorized use of the "application," or computer program, without destroying the functionality and thus usefulness of a copyrightable computer program can be made difficult or impossible.

It is thus the goal of the present invention to provide a higher level of copyright security to object code on par with methods described in digital watermarking systems for digitized media content such as pictures, audio, video and multimedia content in its multifarious forms, as described in previous disclosures, "Steganographic Method and Device" Ser. No. 08/489,172, filed Jun. 7, 1995, now U.S. Pat. No. 5,613,004, and "Human Assisted Random Key Generation and application for Digital Watermark System", Ser. No. 08/587,944, filed on Jan. 17, 1996, the disclosure of which is hereby incorporated by reference.

It is a further goal of the present invention to establish methods of copyright protection that can be combined with such schemes as software metering, network distribution of code and specialized protection of software that is designed to work over a network, such as that proposed by Sun Microsystems in their HotJava browser and Java programming language, and manipulation of application code in proposed distribution of documents that can be exchanged with resources or the look and feel of the document being preserved over a network. Such systems are currently being offered by companies including Adobe, with their Acrobat software. This latter goal is accomplished primarily by means of the watermarking of font, or typeface, resources included in applications or documents, which determine how a bitmap representation of the document is ultimately drawn on a presentation device.

The present invention includes an application of the technology of "digital watermarks." As described in previous disclosures, "Steganographic Method and Device" and "Human Assisted Random Key Generation and application for Digital Watermark System," watermarks are particularly suitable to the identification, metering, distributing and authenticating digitized content such as pictures, audio, video and derivatives thereof under the description of "multimedia content." Methods have been described for combining both cryptographic methods, and steganography, or hiding something in plain view. Discussions of these technologies can be found in Applied Cryptography by Bruce Schneier and The Code Breakers by David Kahn For more information on prior art public-key cryptosystems see U.S. Pat. No. 4,200,770 Diffie-Hellman, U.S. Pat. No. 4,218,582 Hellman, U.S. Pat. No. 4,405,829 RSA, U.S. Pat. No. 4,424,414 Hellman Pohlig. Computer code, or machine language instructions, which are not digitized and have zero tolerance for error, must be protected by derivative or alternative methods, such as those disclosed in this invention, which focuses on watermarking with "keys" derived from license codes or other ownership identification information, and using the watermarks encoded with such keys to hide an essential subset of the application code resources.

BACKGROUND OF THE INVENTION

Increasingly, commercially valuable information is being created and stored in "digital" form. For example, music, photographs and video can all be stored and transmitted as a series of numbers, such as 1's and 0's. Digital techniques let the original information be recreated in a very accurate manner. Unfortunately, digital techniques also let the information be easily copied without the information owner's permission.

Because unauthorized copying is clearly a disincentive to the digital distribution of valuable information, it is important to establish responsibility for copies and derivative copies of such works. For example, if each authorized digital copy of a popular song is identified with a unique number, any unauthorized copy of the song would also contain the number. This would allow the owner of the information, such as a song publisher, to investigate who made the unauthorized copy. Unfortunately, it is possible that the unique number could be erased or altered if it is simply tacked on at the beginning or end of the digital information.

As will be described, known digital "watermark" techniques give creators and publishers of digitized multimedia content localized, secured identification and authentication of that content. In considering the various forms of multimedia content, such as "master," stereo, National Television Standards Committee (NTSC) video, audio tape or compact disc, tolerance of quality will vary with individuals and affect the underlying commercial and aesthetic value of the content. For example, if a digital version of a popular song sounds distorted, it will be less valuable to users. It is therefore desirable to embed copyright, ownership or purchaser information, or some combination of these and related data, into the content in a way that will damage the content if the watermark is removed without authorization.

To achieve these goals, digital watermark systems insert ownership information in a way that causes little or no noticeable effects, or "artifacts," in the underlying content signal. For example, if a digital watermark is inserted into a digital version of a song, it is important that a listener not be bothered by the slight changes introduced by the watermark. It is also important for the watermark technique to maximize the encoding level and "location sensitivity" in the signal to force damage to the content signal when removal is attempted. Digital watermarks address many of these concerns, and research in the field has provided extremely robust and secure implementations.

What has been overlooked in many applications described in the art, however, are systems which closely mimic distribution of content as it occurs in the real world. For instance, many watermarking systems require the original un-watermarked content signal to enable detection or decode operations. These include highly publicized efforts by NEC, Digimarc and others. Such techniques are problematic because, in the real world, original master copies reside in a rights holders vaults and are not readily available to the public.

With much activity overly focused on watermark survivability, the security of a digital watermark is suspect. Any simple linear operation for encoding information into a signal may be used to erase the embedded signal by inverting the process. This is not a difficult task, especially when detection software is a plug-in freely available to the public, such as with Digimarc. In general, these systems seek to embed cryptographic information, not cryptographically embed information into target media content.

Other methods embed ownership information that is plainly visible in the media signal, such as the method described in U.S. Pat. No. 5,530,739 to Braudaway et al. The system described in Braudaway protects a digitized image by encoding a visible watermark to deter piracy. Such an implementation creates an immediate weakness in securing the embedded information because the watermark is plainly visible. Thus, no search for the embedded signal is necessary and the watermark can be more easily removed or altered. For example, while certainly useful to some rights owners, simply placing the symbol "©" in the digital information would only provide limited protection. Removal by adjusting the brightness of the pixels forming the "©" would not be difficult with respect to the computational resources required.

Other relevant prior art includes U.S. Pat. Nos. 4,979,210 and 5,073,925 to Nagata et al., which encodes information by modulating an audio signal in the amplitude/time domain. The modulations introduced in the Nagata process carry a "copy/don't copy" message, which is easily found and circumvented by one skilled in the art. The granularity of encoding is fixed by the amplitude and frequency modulation limits required to maintain inaudibility. These limits are relatively low, making it impractical to encode more information using the Nagata process.

Although U.S. Pat. No. 5,661,018 to Leighton describes a means to prevent collusion attacks in digital watermarks, the disclosed method may not actually provide the security described. For-example, in cases where the watermarking technique is linear, the "insertion envelope" or "watermarking space" is well-defined and thus susceptible to attacks less sophisticated than collusion by unauthorized parties. Over-encoding at the watermarking encoding level is but one simple attack in such linear implementations. Another consideration not made by Leighton is that commercially-valuable content may already exist in a un-watermarked form somewhere, easily accessible to potential pirates, gutting the need for any type of collusive activity. Digitally signing the embedded signal with preprocessing of watermark data is more likely to prevent successful collusion. Furthermore, a "baseline" watermark as disclosed is quite subjective. It is simply described elsewhere in the art as the "perceptually significant" regions of a signal. Making a watermarking function less linear or inverting the insertion of watermarks would seem to provide the same benefit without the additional work required to create a "baseline" watermark. Indeed, watermarking algorithms should already be capable of defining a target insertion envelope or region without additional steps. What is evident is the Leighton patent does not allow for initial prevention of attacks on an embedded watermark as the content is visibly or audibly unchanged.

It is also important that any method for providing security also function with broadcasting media over networks such as the Internet, which is also referred to as "streaming." Commercial "plug-in" products such as RealAudio and RealVideo, as well as applications by vendors VDONet and Xtreme, are common in such network environments. Most digital watermark implementations focus on common file base signals and fail to anticipate the security of streamed signals. It is desirable that any protection scheme be able to function with a plug-in player without advanced knowledge of the encoded media stream.

Other technologies focus solely on file-based security. These technologies illustrate the varying applications for security that must be evaluated for different media and distribution environments. Use of cryptolopes or cryptographic containers, as proposed by IBM in its Cryptolope product, and InterTrust, as described in U.S. Pat. Nos. 4,827,508, 4,977,594, 5,050,213 and 5,410,598, may discourage certain forms of piracy. Cryptographic containers, however, require a user to subscribe to particular decryption software to decrypt data. IBM's InfoMarket and InterTrust's DigiBox, among other implementations, provide a generalized model and need proprietary architecture to function. Every user must have a subscription or registration with the party which encrypts the data. Again, as a form of general encryption, the data is scrambled or encrypted without regard to the media and its formatting. Finally, control over copyrights or other neighboring rights is left with the implementing party, in this case, IBM, InterTrust or a similar provider.

Methods similar to these "trusted systems" exist, and Cerberus Central Limited and Liquid Audio, among a number of companies, offer systems which may functionally be thought of as subsets of IBM and InterTrust's more generalized security offerings. Both Cerberus and Liquid Audio propose proprietary player software which is registered to the user and "locked" in a manner parallel to the locking of content that is distributed via a cryptographic container. The economic trade-off in this model is that users are required to use each respective companies' proprietary player to play or otherwise manipulate content that is downloaded. If, as is the case presently, most music or other media is not available via these proprietary players and more companies propose non-compatible player formats, the proliferation of players will continue. Cerberus and Liquid Audio also by way of extension of their architectures provide for "near-CD quality" but proprietary compression. This requirement stems from the necessity not to allow content that has near-identical data make-up to an existing consumer electronic standard, in Cerberus and Liquid Audio's case the so-called Red Book audio CD standard of 16 bit 44.1 kHz, so that comparisons with the proprietary file may not yield how the player is secured. Knowledge of the player's file format renders its security ineffective as a file may be replicated and played on any common player, not the intended proprietary player of the provider of previously secured and uniquely formatted content. This is the parallel weakness to public key crypto-systems which have gutted security if enough plain text and cipher text comparisons enable a pirate to determine the user's private key.

Many approaches to digital watermarking leave detection and decoding control with the implementing party of the digital watermark, not the creator of the work to be protected. A set of secure digital watermark implementations address this fundamental control issue forming the basis of key-based approaches. These are covered by the following patents and pending applications, the entire disclosures of which are hereby incorporated by reference: U.S. Pat. No. 5,613,004 entitled "Steganographic Method and Device" and its derivative U.S. patent application Ser. No. 08/775,216 (which issued Nov. 11, 1997, as U.S. Pat. No. 5,687,236), U.S. patent application Ser. No. 08/587,944 entitled "Human Assisted Random Key Generation and application for Digital Watermark System" (which issued Oct. 13, 1998, as U.S. Pat. No. 5,822,432), U.S. patent application Ser. No. 08/587,943 entitled "Method for Stega-Cipher Protection of Computer Code" (which issued Apr. 28, 1998, as U.S. Pat. No. 5,748,569), U.S. patent application Ser. No. 08/677,435 entitled "Optimization Methods for the Insertion, Protection, and Detection of Digital Watermarks in Digitized Data" (which issued Mar. 30, 1999, as U.S. Pat. No. 5,889,868) and U.S. patent application Ser. No. 08/772,222 entitled "Z-Transform Implementation of Digital Watermarks" (which issued Jun. 20, 2000, as U.S. Pat. No. 6,078,664). Public key crypto-systems are described in U.S. Pat. Nos. 4,200,770, 4,218,582, 4,405,829 and 4,424,414, the entire disclosures of which are also hereby incorporated by reference.

In particular, an improved protection scheme is described in "Method for Stega-Cipher Protection of Computer Code," U.S. patent application Ser. No. 08/587,943 (which issued Apr. 28, 1998, as U.S. Pat. No. 5,748,569). This technique uses the key-based insertion of binary executable computer code within a content signal that is subsequently, and necessarily, used to play or otherwise manipulate the signal in which it is encoded. With this system, however, certain computational requirements, such as one digital player per digital copy of content, may be necessitated. For instance, a consumer may download many copies of watermarked content. With this technique, the user would also be downloading as many copies of the digital player program. While this form of security may be desirable for some applications, it is not appropriate in many circumstances.

Finally, even when digital information is distributed in encoded form, it may be desirable to allow unauthorized users to play the information with a digital player, perhaps with a reduced level of quality. For example, a popular song may be encoded and freely distributed in encoded form to the public. The public, perhaps using commonly available plug-in digital players, could play the encoded content and hear the music in some degraded form. The music may-sound choppy, or fuzzy or be degraded in some other way. This lets the public decide, based on the available lower quality version of the song, if they want to purchase a key from the publisher to decode, or "clean-up," the content. Similar approaches could be used to distribute blurry pictures or low quality video. Or even "degraded" text, in the sense that only authenticated portions of the text can be determined with the predetermined key or a validated digital signature for the intended message.

In view of the foregoing, it can be appreciated that a substantial need exists for a method allowing encoded content to be played, with degraded quality, by a plug-in digital player, and solving the other problems discussed above.

SUMMARY OF THE INVENTION

The disadvantages of the art are alleviated to a great extent by a method for combining transfer functions with predetermined key creation. In one embodiment, digital information, including a digital sample and format information, is protected by identifying and encoding a portion of the format information. Encoded digital information, including the digital sample and the encoded format information, is generated to protect the original digital information.

In another embodiment, a digital signal, including digital samples in a file format having an inherent granularity, is protected by creating a predetermined key. The predetermined key is comprised of a transfer function-based mask set to manipulate data at the inherent granularity of the file format of the underlying digitized samples.

It is thus a goal of the present invention, to provide a level of security for executable code on similar grounds as that which can be provided for digitized samples. Furthermore, the present invention differs from the prior art in that it does not attempt to stop copying, but rather, determines responsibility for a copy by ensuring that licensing information must be preserved in descendant copies from an original. Without the correct license information, the copy cannot function.

An improvement over the art is disclosed in the present invention, in that the software itself is a set of commands, compiled by software engineer, which can be configured in such a manner as to tie underlying functionality to the license or authorization of the copy in possession by the user. Without such verification, the functions sought out by the user in the form of software cease to properly work. Attempts to tamper or "patch" substitute code resources can be made highly difficult by randomizing the location of said resources in memory on an intermittent basis to resist most attacks at disabling the system.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 1 is a block flow diagram of a method for copy protection or authentication of digital information according to an embodiment of the present invention.

DETAILED DESCRIPTION

In accordance with an embodiment of the present invention, a method combines transfer functions with predetermined key creation. Increased security is achieved in the method by combining elements of "public-key steganography" with cryptographic protocols, which keep in-transit data secure by scrambling the data with "keys" in a manner that is not apparent to those with access to the content to be distributed. Because different forms of randomness are combined to offer robust, distributed security, the present invention addresses an architectural "gray space" between two important areas of security: digital watermarks, a subset of the more general art of steganography, and cryptography. One form of randomness exists in the mask sets that are randomly created to map watermark data into an otherwise unrelated digital signal. The second form of randomness is the random permutations of data formats used with digital players to manipulate the content with the predetermined keys. These forms can be thought of as the transfer function versus the mapping function inherent to digital watermarking processes.

According to an embodiment of the present invention, a predetermined, or randomly generated, key is used to scramble digital information in a way that is unlike known "digital watermark" techniques and public key crypto-systems. As used herein, a key is also referred to as a "mask set" which includes one or more random or pseudo-random series of bits. Prior to encoding, a mask can be generated by any cryptographically secure random generation process. A block cipher, such as a Data Encryption Standard (DES) algorithm, in combination with a sufficiently random seed value, such as one created using a Message Digest 5 (MD5) algorithm, emulates a cryptographically secure random bit generator. The keys are saved in a database, along with information matching them to the digital signal, for use in descrambling and subsequent viewing or playback. Additional file format or transfer property information is prepared and made available to the encoder, in a bit addressable manner. As well, any authenticating function can be combined, such as Digital Signature Standard (DSS) or Secure Hash Algorithm (SHA).

Using the predetermined key comprised of a transfer function-based mask set, the data representing the original content is manipulated at the inherent granularity of the file format of the underlying digitized samples. Instead of providing, or otherwise distributing, watermarked content that is not noticeably altered, a partially "scrambled" copy of the content is distributed. The key is necessary both to register the sought-after content and to descramble the content into its original form.

The present invention uses methods disclosed in "Method for Stega-Cipher Protection of Computer Code," U.S. patent application Ser. No. 08/587,943 (which issued Apr. 28, 1998, as U.S. Pat. No. 5,748,569), with respect to transfer functions related to the common file formats, such as PICT, TIFF, AIFF, WAV, etc. Additionally, in cases where the content has not been altered beyond being encoded with such functional data, it is possible for a digital player to still play the content because the file format has not been altered. Thus, the encoded content could still be played by a plug-in digital player as discrete, digitally sampled signals, watermarked or not. That is, the structure of the file can remain basically unchanged by the watermarking process, letting common file format based players work with the "scrambled" content.

For example, the Compact Disc-Digital Audio (CD-DA) format stores audio information as a series of frames. Each frame contains a number of digital samples representing, for example, music, and a header that contains file format information. As shown in FIG. 1, according to an embodiment of the present invention some of the header information can be identified and "scrambled" using the predetermined key at steps 110 to 130. The music samples can remain unchanged. Using this technique, a traditional CD-DA player will be able to play a distorted version of the music in the sample. The amount of distortion will depend on the way, and extent, that the header, or file format, information has been scrambled. It would also be possible to instead scramble some of the digital samples while leaving the header information alone. In general, the digital signal would be protected by manipulating data at the inherent granularity, or "frames," of the CD-DA file format. To decode the information, a predetermined key is used before playing the digital information at steps 140 and 150.

A key-based decoder can act as a "plug-in" digital player of broadcast signal streams without foreknowledge of the encoded media stream. Moreover, the data format orientation is used to partially scramble data in transit to prevent unauthorized descrambled access by decoders that lack authorized keys. A distributed key can be used to unscramble the scrambled content because a decoder would understand how to process the key. Similar to on-the-fly decryption operations, the benefits inherent in this embodiment include the fact that the combination of watermarked content security, which is key-based, and the descrambling of the data, can be performed by the same key which can be a plurality of mask sets. The mask sets may include primary, convolution and message delimiter masks with file format data included.

The creation of an optimized "envelope" for insertion of watermarks provides the basis of much watermark security, but is also a complementary goal of the present invention. The predetermined or random key that is generated is not only an essential map to access the hidden information signal, but is also the descrambler of the previously scrambled signal's format for playback or viewing.

In a system requiring keys for watermarking content and validating the distribution of the content, different keys may be used to encode different information while secure one way hash functions or one-time pads may be incorporated to secure the embedded signal. The same keys can be used to later validate the embedded digital signature, or even fully decode the digital watermark if desired. Publishers can easily stipulate that content not only be digitally watermarked but that distributors must check the validity of the watermarks by performing digital signature-checks with keys that lack any other functionality. The system can extend to simple authentication of text in other embodiments.

Before such a market is economically feasible, there are other methods for deploying key-based watermarking coupled with transfer functions to partially scramble the content to be distributed without performing full public key encryption, i.e., a key pair is not necessarily generated, simply, a predetermined key's function is created to re-map the data of the content file in a lossless process. Moreover, the scrambling performed by the present invention may be more dependent on the file in question. Dissimilarly, encryption is not specific to any particular media but is performed on data. The file format remains unchanged, rendering the file useable by any conventional viewer/player, but the signal quality can be intentionally degraded in the absence of the proper player and key. Public-key encryption seeks to completely obscure the sensitive "plaintext" to prevent comparisons with the "ciphertext" to determine a user's private keys. Centralized encryption only differs in the utilization of a single key for both encryption and decryption making the key even more highly vulnerable to attacks to defeat the encryption process. With the present invention, a highly sought after photograph may be hazy to the viewer using any number of commonly available, nonproprietary software or hardware, without the authorized key. Similarly, a commercially valuable song may sound poor.

The benefit of some form of cryptography is not lost in the present invention. In fact, some piracy can be deterred when the target signal may be known but is clearly being protected through scrambling. What is not anticipated by known techniques, is an ala carte method to change various aspects of file formatting to enable various "scrambled states" for content to be subsequently distributed. An image may lack all red pixels or may not have any of the most significant bits activated. An audio sample can similarly be scrambled to render it less-than-commercially viable.

The present invention also provides improvements over known network-based methods, such as those used for the streaming of media data over the Internet. By manipulating file formats, the broadcast media, which has been altered to "fit" within electronic distribution parameters, such as bandwidth availability and error correction considerations, can be more effectively utilized to restrict the subsequent use of the content while in transit as well as real-time viewing or playing.

The mask set providing the transfer function can be read on a per-use basis by issuing an authorized or authenticating "key" for descrambling the signal that is apparent to a viewer or a player or possessor of the authenticating key. The mask set can be read on a per-computer basis by issuing the authorized key that is more generalized for the computer that receives the broadcast signals. Metering and subscription models become viable advantages over known digital watermark systems which assist in designating the ownership of a copy of digitized media content, but do not prevent or restrict the copying or manipulation of the sampled signal in question. For broadcast or streamed media, this is especially the case. Message authentication is also possible, though not guaranteeing the same security as an encrypted file as with general crypto systems.

The present invention thus benefits from the proprietary player model without relying on proprietary players. No new players will be necessary and existing multimedia file formats can be altered to exact a measure of security which is further increased when coupled with digital watermarks. As with most consumer markets for media content, predominant file formats exist, de facto, and corresponding formats for computers likewise exist. For a commercial compact disc quality audio recording, or 16 bit 44.1 kHz, corresponding file formats include: Audio Interchange File Format (AIFF), Microsoft WAV, Sound Designer II, Sun's .au, Apple's Quicktime, etc. For still image media, formats are similarly abundant: TIFF, PICT, JPEG, GIF, etc. Requiring the use of additional proprietary players, and their complementary file formats, for limited benefits in security is wasteful. Moreover, almost all computers today are multimedia-capable, and this is increasingly so with the popularity of Intel's MMX chip architecture and the PowerPC line of microchips. Because file formatting is fundamental in the playback of the underlying data, the predetermined key can act both as a map, for information to be encoded as watermark data regarding ownership, and a descrambler of the file that has been distributed. Limitations will only exist in how large the key must be retrofitted for a given application, but any manipulation of file format information is not likely to exceed the size of data required versus that for an entire proprietary player.

As with previous disclosures by the inventor on digital watermarking techniques, the present invention may be implemented with a variety of cryptographic protocols to increase both confidence and security in the underlying system. A predetermined key is described as a set of masks. These masks may include primary, convolution and message delimiter mask. In previous disclosures, the functionality of these masks is defined solely for mapping. The present invention includes a mask set which is also controlled by the distributing party of a copy of a given media signal. This mask set is a transfer function which is limited only by the parameters of the file format in question. To increase the uniqueness or security of each key used to scramble a given media file copy, a secure one way hash function can be used subsequent to transfer properties that are initiated to prevent the forging of a particular key. Public and private keys may be used as key pairs to further increase the unlikeliness that a key may be compromised.

These same cryptographic protocols can be combined with the embodiments of the present invention in administering streamed content that requires authorized keys to correctly display or play the streamed content in an unscrambled manner. As with digital watermarking, symmetric or asymmetric public key pairs may be used in a variety of implementations. Additionally, the need for certification authorities to maintain authentic key-pairs becomes a consideration for greater security beyond symmetric key implementations. The cryptographic protocols makes possible, as well, a message of text to be authenticated by a message authenticating function in a general computing device that is able to ensure secure message exchanges between authorizing parties.

An executable computer program is variously referred to as an application, from the point of view of a user, or executable object code from the point of view of the engineer. A collection of smaller, atomic (or indivisible) chunks of object code typically comprise the complete executable object code or application which may also require the presence of certain data resources. These indivisible portions of object code correspond with the programmers' function or procedure implementations in higher level languages, such as C or Pascal. In creating an application, a programmer writes "code" in a higher level language, which is then compiled down into "machine language," or, the executable object code, which can actually be run by a computer, general purpose or otherwise. Each function, or procedure, written in the programming language, represents a self-contained portion of the larger program, and implements, typically, a very small piece of its functionality. The order in which the programmer types the code for the various functions or procedures, and the distribution of and arrangement of these implementations in various files which hold them is unimportant. Within a function or procedure, however, the order of individual language constructs, which correspond to particular machine instructions is important, and so functions or procedures are considered indivisible for purposes of this discussion. That is, once a function or procedure is compiled, the order of the machine instructions which comprise the executable object code of the function is important and their order in the computer memory is of vital importance. Note that many "compilers" perform "optimizations" within functions or procedures, which determine, on a limited scale, if there is a better arrangement for executable instructions which is more efficient than that constructed by the programmer, but does not change the result of the function or procedure. Once these optimizations are performed, however, making random changes to the order of instructions is very likely to "break" the function. When a program is compiled, then, it consists of a collection of these sub-objects, whose exact order or arrangement in memory is not important, so long as any sub-object which uses another sub-object knows where in memory it can be found.

The memory address of the first instruction in one of these sub-objects is called the "entry point" of the function or procedure. The rest of the instructions comprising that sub-object immediately follow from the entry point. Some systems may prefix information to the entry point which describes calling and return conventions for the code which follows, an example is the Apple Macintosh Operating System (MacOS). These sub-objects can be packaged into what are referred to in certain systems as "code resources," which may be stored separately from the application, or shared with other applications, although not necessarily. Within an application there are also data objects, which consist of some data to be operated on by the executable code. These data objects are not executable. That is, they do not consist of executable instructions. The data objects can be referred to in certain systems as "resources."

When a user purchases or acquires a computer program, she seeks a computer program that "functions" in a desired manner. Simply, computer software is overwhelmingly purchased for its underlying functionality. In contrast, persons who copy multimedia content, such as pictures, audio and video, do so for the entertainment or commercial value of the content. The difference between the two types of products is that multimedia content is not generally interactive, but is instead passive, and its commercial value relates more on passive not interactive or utility features, such as those required in packaged software, set-top boxes, cellular phones, VCRs, PDAs, and the like. Interactive digital products which include computer code may be mostly interactive but can also contain content to add to the interactive experience of the user or make the underlying utility of the software more aesthetically pleasing. It is a common concern of both of these creators, both of interactive and passive multimedia products, that "digital products" can be easily and perfectly copied and made into unpaid or unauthorized copies. This concern is especially heightened when the underlying product is copyright protected and intended for commercial use.

The first method of the present invention described involves hiding necessary "parts" or code "resources" in digitized sample resources using a "digital watermarking" process, such as that described in the "Steganographic Method and Device" patent application. The basic premise for this scheme is that there are a certain sub-set of executable code resources, that comprise an application and that are "essential" to the proper function of the application. In general, any code resource can be considered "essential" in that if the program proceeds to a point where it must "call" the code resource and the code resource is not present in memory, or cannot be loaded, then the program fails. However, the present invention uses a definition of "essential" which is more narrow. This is because, those skilled in the art or those with programming experience, may create a derivative program, not unlike the utility provided by the original program, by writing additional or substituted code to work around unavailable resources. This is particularly true with programs that incorporate an optional "plug-in architecture," where several code resources may be made optionally available at run-time. The present invention is also concerned with concentrated efforts by technically skilled people who can analyze executable object code and "patch" it to ignore or bypass certain code resources. Thus, for the present embodiment's purposes, "essential" means that the function which distinguishes this application from any other application depends upon the presence and use of the code resource in question. The best candidates for this type of code resources are NOT optional, or plug-in types, unless special care is taken to prevent work-arounds.

Given that there are one or more of these essential resources, what is needed to realize the present invention is the presence of certain data resources of a type which are amenable to the "stega-cipher" process described in the "Steganographic Method and Device" U.S. Pat. No. 5,613,004. Data which consists of image or audio samples is particularly useful. Because this data consists of digital samples, digital watermarks can be introduced into the samples. What is further meant is that certain applications include image and audio samples which are important to the look and feel of the program or are essential to the processing of the application's functionality when used by the user. These computer programs are familiar to users of computers but also less obvious to users of other devices that run applications that are equivalent in some measure of functionality to general purpose computers including, but not limited to, set-top boxes, cellular phones, "smart televisions," PDAs and the like. However, programs still comprise the underlying "operating systems" of these devices and are becoming more complex with increases in functionality.

One method of the present invention is now discussed. When code and data resources are compiled and assembled into a precursor of an executable program the next step is to use a utility application for final assembly of the executable application. The programmer marks several essential code resources in a list displayed by the utility. The utility will choose one or several essential code resources, and encode them into one or several data resources using the stegacipher process. The end result will be that these essential code resources are not stored in their own partition, but rather stored as encoded information in data resources. They are not accessible at run-time without the key. Basically, the essential code resources that provide functionality in the final end-product, an executable application or computer program, are no longer easily and recognizably available for manipulation by those seeking to remove the underlying copyright or license, or its equivalent information, or those with skill to substitute alternative code resources to "force" the application program to run as an unauthorized copy. For the encoding of the essential code resources, a "key" is needed. Such a key is similar to those described in U.S. Pat. No. 5,613,004, the "Steganographic Method and Device" patent. The purpose of this scheme is to make a particular licensed copy of an application distinguishable from any other. It is not necessary to distinguish every instance of an application, merely every instance of a license. A licensed user may then wish to install multiple copies of an application, legally or with authorization. This method, then, is to choose the key so that it corresponds, is equal to, or is a function of, a license code or license descriptive information, not just a text file, audio clip or identifying piece of information as desired in digital watermarking schemes extant and typically useful to stand-alone, digitally sampled content. The key is necessary to access the underlying code, i.e., what the user understands to be the application program.

The assembly utility can be supplied with a key generated from a license code generated for the license in question. Alternatively, the key, possibly random, can be stored as a data resource and encrypted with a derivative of the license code. Given the key, it encodes one or several essential resources into one or several data resources. Exactly which code resources are encoded into which data resources may be determined in a random or pseudo random manner. Note further that the application contains a code resource which performs the function of decoding an encoded code resource from a data resource. The application must also contain a data resource which specifies in which data resource a particular code resource is encoded. This data resource is created and added at assembly time by the assembly utility. The application can then operate as follows:

1) when it is run for the first time, after installation, it asks the user for personalization information, which includes the license code. This can include a particular computer configuration;

2) it stores this information in a personalization data resource;

3) Once it has the license code, it can then generate the proper decoding key to access the essential code resources.

Note that the application can be copied in an uninhibited manner, but must contain the license code issued to the licensed owner, to access its essential code resources. The goal of the invention, copyright protection of computer code and establishment of responsibility for copies, is thus accomplished.

This invention represents a significant improvement over prior art because of the inherent difference in use of purely informational watermarks versus watermarks which contain executable object code. If the executable object code in a watermark is essential to an application which accesses the data which contains the watermark, this creates an all-or-none situation. Either the user must have the extracted watermark, or the application cannot be used, and hence the user cannot gain full access to the presentation of the information in the watermark bearing data. In order to extract a digital watermark, the user must have a key. The key, in turn, is a function of the license information for the copy of the software in question. The key is fixed prior to final assembly of the application files, and so cannot be changed at the option of the user. That, in turn, means the license information in the software copy must remain fixed, so that the correct key is available to the software. The key and the license information are, in fact, interchangeable. One is merely more readable than the other. In U.S. Pat. No. 5,613,004, the "Steganographic Method and Device, patent", the possibility of randomization erasure attacks on digital watermarks was discussed. Simply, it is always possible to erase a digital watermark, depending on how much damage you are willing to do to the watermark-bearing content stream. The present invention has the significant advantage that you must have the watermark to be able to use the code it contains. If you erase the watermark you have lost a key piece of the functionality of the application, or even the means to access the data which bear the watermark.

A preferred embodiment would be implemented in an embedded system, with a minimal operating system and memory. No media playing "applets," or smaller sized applications as proposed in new operating environments envisioned by Sun Microsystems and the advent of Sun's Java operating system, would be permanently stored in the system, only the bare necessities to operate the device, download information, decode watermarks and execute the applets contained in them. When an applet is finished executing, it is erased from memory. Such a system would guarantee that content which did not contain readable watermarks could not be used. This is a powerful control mechanism for ensuring that content to be distributed through such a system contains valid watermarks. Thus, in such networks as the Internet or set-top box controlled cable systems, distribution and exchange of content would be made more secure from unauthorized copying to the benefit of copyright holders and other related parties. The system would be enabled to invalidate, by default, any content which has had its watermark(s) erased, since the watermark conveys, in addition to copyright information, the means to fully access, play, record or otherwise manipulate, the content.

A second method according to the present invention is to randomly re-organize program memory structure to prevent attempts at memory capture or object code analysis. The object of this method is to make it extremely difficult to perform memory capture-based analysis of an executable computer program. This analysis is the basis for a method of attack to defeat the system envisioned by the present invention.

Once the code resources of a program are loaded into memory, they typically remain in a fixed position, unless the computer operating system finds it necessary to rearrange certain portions of memory during "system time," when the operating system code, not application code, is running Typically, this is done in low memory systems, to maintain optimal memory utilization. The MacOS for example, uses Handles, which are double-indirect pointers to memory locations, in order to allow the operating system to rearrange memory transparently, underneath a running program. If a computer program contains countermeasures against unlicensed copying, a skilled technician can often take a snapshot of the code in memory, analyze it, determine which instructions comprise the countermeasures, and disable them in the stored application file, by means of a "patch." Other applications for designing code that moves to prevent scanning-tunnelling microscopes, and similar high sensitive hardware for analysis of electronic structure of microchips running code, have been proposed by such parties as Wave Systems. Designs of Wave Systems' microchip are intended for preventing attempts by hackers to "photograph" or otherwise determine "burn in" to microchips for attempts at reverse engineering. The present invention seeks to prevent attempts at understanding the code and its organization for the purpose of patching it. Unlike systems such as Wave Systems', the present invention seeks to move code around in such a manner as to complicate attempts by software engineers to reengineer a means to disable the methods for creating licensed copies on any device that lacks "trusted hardware." Moreover, the present invention concerns itself with any application software that may be used in general computing devices, not chipsets that are used in addition to an underlying computer to perform encryption. Wave Systems' approach to security of software, if interpreted similarly to the present invention, would dictate separate microchip sets for each piece of application software that would be tamperproof. This is not consistent with the economics of software and its distribution.

Under the present invention, the application contains a special code resource which knows about all the other code resources in memory. During execution time, this special code resource, called a "memory scheduler," can be called periodically, or at random or pseudo random intervals, at which time it intentionally shuffles the other code resources randomly in memory, so that someone trying to analyze snapshots of memory at various intervals cannot be sure if they are looking at the same code or organization from one "break" to the next. This adds significant complexity to their job. The scheduler also randomly relocates itself when it is finished. In order to do this, the scheduler would have to first copy itself to a new location, and then specifically modify the program counter and stack frame, so that it could then jump into the new copy of the scheduler, but return to the correct calling frame. Finally, the scheduler would need to maintain a list of all memory addresses which contain the address of the scheduler, and change them to reflect its new location.

The methods described above accomplish the purposes of the invention—to make it hard to analyze captured memory containing application executable code in order to create an identifiable computer program or application that is different from other copies and is less susceptible to unauthorized use by those attempting to disable the underlying copyright protection system. Simply, each copy has particular identifying information making that copy different from all other copies.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A computing device for running application software, comprising:
   memory designed to store data in non transitory form;
   an operating system;
   wherein said memory stores an application software;
   wherein said application software comprises (1) a memory scheduler code resource and (2) other code resources;
   wherein said application software is designed to call said memory scheduler code resource;
   wherein said memory scheduler code resource, when called, functions to shuffle said other code resources in said memory; and
   wherein said memory scheduler code resource is designed to modify a stack frame in said memory.

2. A system for executing an application on a computer system, comprising:
   a computer system comprising a processor for processing instructions and memory designed to store data in non transitory form;
   a software application comprising a plurality of executable code resources loaded in said memory;
   said memory storing a plurality of addresses, each one of said plurality of addresses associated with an address of a corresponding one of said plurality of executable code resources;
   wherein a first one of said plurality of executable code resources is designed to relocate at least each of the other ones of said plurality of executable code resources to different addresses within said memory during execution of said software application, using said processor; and
   wherein said first one of said plurality of executable code resources is designed to modify a stack frame in said memory.

3. The device of claim 1 further comprising a program counter designed to store values and wherein said operating system is designed to enable application software to modify a value stored by said program counter.

4. The device of claim 1 further comprising a program counter designed to store values and wherein said memory scheduler code resource is designed to modify a value stored by said program counter.

5. The device of claim 1 wherein said memory scheduler code resource is designed to modify a calling address, and to copy itself to a memory location associated with said calling address.

6. The device of claim 1 wherein said operating system is designed to call said memory scheduler code resource.

7. The device of claim 1 wherein said memory scheduler code resource maintains a list of addresses in said memory, wherein each one of said addresses is associated with one of the code resources.

8. The device of claim 1 wherein said memory scheduler code resource maintains a list of addresses in said memory associated with said other code resources in said memory.

9. The device of claim 1 further comprising a processor for processing instructions defined by said application software.

10. A system for executing application software code, comprising:
    a memory designed to store data in non transitory form, and storing executable code resources;
    wherein said executable code resources comprise a memory scheduler and other executable code resources;
    wherein said memory scheduler is designed to shuffle said other executable code resources in said memory; and wherein said memory scheduler is designed to modify a stack frame in said memory.

11. The system of claim 10, wherein said memory scheduler is designed to shuffle said other executable code resources randomly in said memory.

12. The system of claim 10 wherein said memory scheduler is designed to shuffle said other executable code resources in said memory such that the shuffling results in a change in location in said memory of at least one of said other executable code resources.

13. The system of claim 10 further comprising a program counter designed to store values and wherein said memory scheduler is designed to modify values stored by said program counter.

14. The system of claim 10 wherein said memory scheduler maintains a list of addresses in said memory of at least one code resource.

15. The system of claim 10 wherein said memory scheduler maintains a list of addresses in said memory of said other executable code resources.

16. The system of claim 10 designed to call said memory scheduler.

17. The system of claim 10 wherein said application software code is designed to call said memory scheduler.

18. The system of claim 2 wherein said first one of said plurality of executable code resources is a memory scheduler code resource, wherein, when said memory scheduler code resource is called, said memory scheduler code resource functions to shuffle said memory scheduler code resource randomly in said memory.

19. The system of claim 2 wherein said first one is also designed to relocate itself to a different address during execution of said software application.

20. The system of claim 2 wherein said system is designed to repeatedly relocate said at least each of the other ones of said plurality of executable code resources to different addresses within said memory during execution of said software application.

21. A system comprising:
a processor;
a memory designed to store data in non transitory form;
wherein said processor is coupled to said memory;
wherein said system is configured to load a program comprising code resources into said memory and to shuffle at least one code resource into a different location in said memory after said program has been loaded into said memory; and
wherein one of said code resources is designed to modify a stack frame in said memory.

22. A system comprising:
a processor designed to process instructions;
a memory designed to store data in non transitory form;
wherein said processor is coupled to said memory;
wherein said system is configured to load an executable program comprising at least two code resources into said memory and to randomize the location of at least one of the at least two code resources in the said memory, using said processor; and
wherein one of the at least two code resources is designed to modify a stack frame in said memory.

23. A system for executing a program comprising code, comprising:
a processor designed to process instructions;
a memory designed to store data in non transitory form;
wherein said processor is coupled to said memory;
a memory scheduler configured to randomize location of code defining a code resource, in said memory, using said processor; and
wherein said memory scheduler is configured to modify a stack frame in said memory.

24. The system of claim 23 wherein said memory scheduler is configured to repeatedly randomize the location of at least a portion of the code in said memory.

25. The device of claim 1 wherein each one of said other code resources comprises a sequence of instructions that have sequential addresses in said memory.

26. The device of claim 25 wherein each one of said other code resources defines a function or procedure.

27. The device of claim 1 wherein each one of said other code resources comprises a sequence of instructions that immediately follow one another in said memory.

28. The device of claim 27 wherein each one of said other code resources defines a function or procedure.

29. A system comprising:
a processor;
a memory coupled to said processor;
wherein said memory is designed to store data in non transitory form;
wherein said system is configured to load a program comprising code resources into said memory and to shuffle at least a subset of said code resources into a different location in said memory after said program has been loaded into said memory; and
wherein one of said code resources is configured to modify a stack frame in said memory.

30. The system of claim 2 wherein each one of said plurality of executable code resources loaded in said memory comprises a sequence of instructions that have sequential addresses in said memory.

31. The system of claim 30 wherein each one of said plurality of executable code resources loaded in said memory defines a function or procedure.

32. The system of claim 31 wherein each one of said plurality of executable code resources loaded in said memory is an essential code resource.

33. The system of claim 2 wherein each one of said plurality of executable code resources loaded in said memory comprises a sequence of instructions, and the sequence of instructions for one of said plurality of executable code resources loaded in said memory has memory addresses that immediately follow one another.

34. The system of claim 33 wherein each one of said plurality of executable code resources loaded in said memory defines a function or procedure.

35. The system of claim 33 wherein said system comprises one of a set-top box; a cellular phone; a smart television; and a personal digital assistant (PDA).

36. A system for protecting a software application, said software application comprising a plurality of executable code resources, said system comprising:
a processor;
memory for storing data in non transitory form;
wherein said processor is coupled to said memory for transmitting data there between;
wherein, when executing said software application, said system is configured to store in said memory an original plurality of code resource addresses;
wherein, when executing said software application, said system is configured to store a plurality of executable code resources for executing said software application;

wherein each one of said original plurality of code resource addresses specifies an address in said memory of one of said plurality of executable code resources;

wherein, when executing said software application, said system is configured to (1) relocate each one of said plurality of executable code resources in said memory so that each one of said plurality of executable code resources is specified by each one of a new plurality of code resource addresses and (2) store in said memory each one of said new plurality of code resource addresses; and wherein one of said plurality of executable code resources is configured to modify a stack frame in said memory.

37. The system of claim 36, wherein said system is configured to repeatedly (1) relocate each one of said plurality of executable code resources in said memory so that each one of said plurality of executable code resources is specified by each one of a new plurality of code resource addresses and (2) store in said memory each one of said new plurality of code resource addresses.

38. The system of claim 36, wherein each one of said plurality of executable code resources is relocated to random addresses.

39. The system of claim 36, wherein each one said original plurality of code resource addresses specifies an entry point of an original location in said memory of each one of said plurality of executable code resources.

40. The system of claim 36, wherein each one said new plurality of code resource addresses specifies an entry point of a new location in said memory of each one of said plurality of executable code resources.

41. The system of claim 36 wherein each one of said plurality of executable code resources is stored in sequential locations in said memory.

42. The system of claim 41 wherein each one of said plurality of executable code resources executes a function or procedure when called.

43. The system of claim 36 wherein each one of said plurality of executable code resources executes a function or procedure.

44. The system of claim 36 wherein said system is configured to relocate each one of said plurality of executable code resources in said memory in response to a call to an executable code resource of said plurality of executable code resources.

45. The system of claim 44 wherein said system is configured to update a reference to said executable code resource in said memory to reflect a new address in said memory of said executable code resource resulting from relocating said executable code resource.

46. The system of claim 45 wherein said executable code resource is a memory scheduler which is called periodically, or at random or pseudo random intervals.

47. A computer program product storing in non-transitory form instructions defining a software program, which instructions, when loaded into a computer system instruct the computer system to perform the following steps:
load said program into memory of said computer system;
wherein said software program, as loaded into memory, comprises a plurality of code resources;
shuffle locations in said memory of at least a subset of said plurality of code resources; and
wherein said shuffle comprises one of said plurality of code resources modifying a stack frame in said memory.

48. The product of claim 47 wherein each one of said subset of said code resources comprises a sequence of instructions that have sequential addresses in said memory.

49. The product of claim 47 wherein each one of said subset of said code resources defines a function or procedure.

50. The product of claim 47 wherein said subset comprises at least two code resources.

* * * * *